United States Patent Office 3,021,340
Patented Feb. 13, 1962

3,021,340
2-OXODIOXOLANES
John L. Anderson, Wilmington, Del., assignor to E. I. du Pont de Nemours and Company, Wilmington, Del., a corporation of Delaware
No Drawing. Filed Apr. 13, 1953, Ser. No. 348,580
8 Claims. (Cl. 260—340.2)

This invention relates to heterocyclic organic compounds and more particularly to unsaturated and chlorinated heterocyclic compounds and to a method for their preparation.

This application is a continuation-in-part of my co-pending application Serial No. 304,000, filed August 12, 1952, now abandoned.

Heterocyclic compounds are of use in various fields, e.g., as solvents and chemical intermediates, and in biological applications. New compounds of this nature are therefore desirable to extend these fields of utility.

This invention has as an object the preparation of new heterocyclic compounds. A further object is the provision of a process for such preparation. Another object is the provision of new intermediates. Other objects will appear hereinafter.

These objects are accomplished by the present invention of 2-oxodioxole,

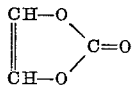

and chlorinated 2-oxodioxolanes of the general formula

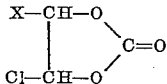

wherein X is chlorine or hydrogen, i.e., 2-oxodioxolanes having up to two atoms of chlorine replacing ring hydrogen but not more than one chlorine on a given carbon. These chlorinated 2-oxodioxolanes and 2-oxodioxole are prepared by chlorinating 2-oxodioxolane in the presence of an organic liquid reaction medium. The chlorination is preferably carried out in the presence of a halogen carrier as catalyst.

In a preferred embodiment of this invention, 4-chloro- and 4,5-dichloro-2-oxodioxolane are prepared by passing an excess of chlorine gas through a refluxing mixture of 2-oxodioxolane in a low-boiling organic liquid reaction medium, e.g., carbon tetrachloride, in the presence of a chlorine carrier, e.g., ferric chloride, aluminum chloride, etc., until the evolution of hydrogen chloride subsides, or until there is little or no further increase in the density of the reaction products. Best yields of the chloro-2-oxodioxolanes are obtained when the rate of chlorine introduction is great enough to provide an excess of chlorine to carry by-product hydrogen chloride out of the reaction zone rapidly. The removal of hydrogen chloride can also be effected by passing an inert gas, e.g., nitrogen, through the reaction zone, either mixed with the chlorine or introduced separately.

The actual time of reaction can vary widely, depending on the rate of chlorine addition, the temperature at which the reaction is being carried out, the quantity of 2-oxodioxolane being used, and the degree of substitution desired. Reaction times of a few hours up to several days are satisfactory.

The reaction mixture contains 2-oxodioxole and both the mono- and the dichloro- substitution products of 2-oxodioxolane. The proportions of each can be varied by varying the reaction conditions, particularly by changing the time of reaction and the amount of chlorine employed. Thus, longer reaction times and larger amounts of chlorine favor the formation of the dichloro derivative. The dichloro compound can also be prepared by chlorinating the mono-chloro-2-oxodioxolane isolated in the process of this invention. The reaction products are isolated from the reaction mixture by fractional distillation, preferably by fractionation under reduced pressure.

The reaction is commonly carried out at atmospheric pressure and it proceeds at ordinary temperatures. Since the rate of reaction increases with an increase in operating temperature, it is desirable to employ moderately elevated temperatures to obtain a practical rate of reaction. Reaction temperatures of 25° to 120° C. are operable, but temperatures of 70° to 85° C. are preferred. The temperature, 75–80° C., at which a carbon tetrachloride-ethylene carbonate reaction mixture boils at atmospheric pressure, is satisfactory.

The preferred liquid organic reaction media used in the process of this invention are those which are not chlorinated under the conditions of the reaction. Carbon tetrachloride is very satisfactory for this purpose, but other liquid chlorohydrocarbons such as chloroform can be used. However, the use of chloroform is less desirable since it is chlorinated under the reaction conditions and thus uses up some of the chlorine.

The following examples in which parts are by weight are illustrative of the invention.

EXAMPLE I

A reaction vessel fitted with a reflux condenser is charged with 88 parts of ethylene carbonate (2-oxodioxolane), 319 parts of carbon tetrachloride and a trace, about 0.1 part, of anhydrous ferric chloride, and heated to the boiling point of the mixture. Gaseous chlorine is passed through the refluxing mixture for 36 hours. At this time the formation of hydrogen chloride subsides. The reaction mixture is then distilled at 10 mm. mercury pressure and, after removing the carbon tetrachloride, there is obtained 122.5 parts of crude reaction product. On redistillation of the crude product there are obtained, after removal of low-boiling material, 32.8 parts (corresponding to a yield of 21%) of 4,5-dichloro-2-oxodioxolane boiling at 28° C./0.8 mm., and 76.6 parts (62.5% of the theory) of 4-chloro-2-oxodioxolane boiling at 73° C./2 mm.

Another redistillation of these two products gives analytically pure materials.

*4,5-dichloro-2-oxodioxolane.*—Boiling point, 84° C./20 mm.; $n_D^{25}$, 1.4623; $d^{25}$, 1.585.

*Analysis.*—Calculated for $C_3H_2O_3Cl_2$: C, 23.02%; H, 1.27%; Cl, 45.2%. Found: C, 23.34%; H, 1.42%; Cl, 44.3%.

*4-chloro-2-oxodioxolane.*—Boiling point, 73° C./2.0 mm.; $n_D^{25}$, 1.4532; $d^{25}$, 1.513.

*Analysis.*—Calculated for $C_3H_3O_3Cl$: C, 29.4%; H, 2.45%; Cl, 29.0%. Found: C, 29.75%; H, 2.61%; Cl, 28.27%.

Infrared absorption spectra obtained for the two chlorinated products of this example show that the dichloro compound must be 4,5-dichloro-2-oxodioxolane and not the 4,4 derivative. The infrared spectra also confirm the oxodioxolane structure of both products.

In the low-boiling material isolated on redistillation there is a fraction (2.1 parts) boiling at about 29° C./2.5 mm. which consists substantially of 2-oxodioxole,

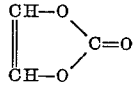

formed as a by-product in the chlorination reaction. The identity of this by-product is evidenced by certain absorption bands in its infrared absorption spectrum, i.e., strong absorption bands at 3.1 and 3.18 microns indicating vinyl hydrogens, absorption bands at about 5.5 microns indicating ring carbonyl and additional absorption bands at 6.41, 7.45, 7.5, 8.65, 9.1, 9.25, 11.05, 11.23, 12.85, 13.5 and 14.0 microns consistent with the 2-oxodioxole ring system.

EXAMPLE II

A mixture of 17.6 parts of ethylene carbonate (2-oxodioxolane) and 80 parts of carbon tetrachloride is placed in a reaction vessel fitted with a reflux condenser. The mixture is heated to the boiling point and chlorine gas is introduced under the surface of the liquid during a period of six hours while the mixture is maintained at a slow reflux. The reaction mixture obtained is in two layers; the upper layer is separated and then distilled. There is obtained a small amount of 4-chloro-2-oxodioxolane, $n_D^{25}$, 1.4539.

*Analysis.*—Calculated for $C_3H_3O_3Cl$: C, 29.4%; H, 2.45%. Found: C, 28.85%; H, 2.44%.

The infrared absorption spectrum for the product is observed to be compatible with the 4-chloro-2-oxodioxolane structure.

While the use of a catalyst is not essential, as illustrated by Example II, it is preferred to use a chlorine carrier as catalyst to increase the rate of reaction. In addition to the ferric chloride of Example I, other chlorine carriers can be used, including metallic iron, copper oxide, bromine, iodine, sulfur, and the halides of iron, antimony, tin, arsenic, phosphorus, aluminum, and copper. The amount of catalyst used is not critical, amounts ranging from 0.01% to 1% being satisfactory.

The 2-oxodioxole and the chlorinated 2-oxodioxolanes of this invention are useful for various purposes. Because of the reactivity of the chlorine atoms, the chlorinated 2-oxodioxolanes are especially useful as chemical intermediates. For example, treatment of 4-chloro-2-oxodioxolane with silver acetate gives 4-acetoxy-2-oxodioxolane, and treatment of the same chloro-2-oxodioxolane with trimethylamine gives the corresponding quaternary chloride. The mono- and dichloro-2-oxodioxolanes are also useful as solvents for various types of polymeric materials, e.g., ethylcellulose, cellulose acetate, and other cellulose ethers and esters. The 2-oxodioxole can be polymerized to a linear addition polymer, a polycarbonate, by bulk polymerization of the 2-oxodioxole using a free radical producing addition polymerization catalyst, e.g., $\alpha,\alpha'$-azodiisobutyronitrile at 85–90° C. This polycarbonate can in turn be hydrolyzed to a linear polycarbinol. The 2-oxodioxole can be brominated to a dibromodioxolane and this can be hydrolyzed to glyoxal.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A compound of the formula

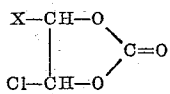

wherein X is selected from the group consisting of chlorine and hydrogen.

2. 4,5-dichloro-2-oxodioxolane.

3. 4-chloro-2-oxodioxolane.

4. Process which comprises bringing chlorine in contact, at 25–120° C. and in a liquid organic reaction medium, with 2-oxodioxolane.

5. Process which comprises bringing chlorine in contact, at 25–120° C. and in a liquid organic reaction medium, with 2-oxodioxolane and fractionally distilling the reaction mixture, to isolate the 2-oxodioxole.

6. The process of claim 4 in which the distillation is carried out under reduced pressure.

7. Process which comprises bringing chlorine in contact, at 25–120° C. and in a liquid organic reaction medium, with 2-oxodioxolane and fractionally distilling the reaction mixture, to isolate the chloro-2-oxodioxolanes.

8. The process of claim 5 in which the distillation is carried out under reduced pressure.

References Cited in the file of this patent

UNITED STATES PATENTS

| | | |
|---|---|---|
| 2,466,657 | Heath et al. | Apr. 5, 1949 |
| 2,563,771 | Adelson | Aug. 7, 1951 |
| 2,918,478 | Newman | Dec. 22, 1959 |

OTHER REFERENCES

Euler et al.: Chem. Abst., vol. 44, page 1909 (1950), citing Arkiv. Kemi–1, pages 325–30 (1949).

Contardi et al.: Gazz. Chim. Ital., 64, pp. 522–525 (1934).

Beilstein: Handbuch der Org. Chem., vol. XIX, p. 658 (1934), 1st supplement.

UNITED STATES PATENT OFFICE
CERTIFICATE OF CORRECTION

Patent No. 3,021,340　　　　　　　　　　　　February 13, 1962

John L. Anderson

It is hereby certified that error appears in the above numbered patent requiring correction and that the said Letters Patent should read as corrected below.

Column 4, line 26, for the claim reference numeral "4" read -- 5 --; line 32, for the claim reference numeral "5" read -- 7 --.

Signed and sealed this 19th day of June 1962.

(SEAL)
Attest:

ERNEST W. SWIDER
Attesting Officer

DAVID L. LADD
Commissioner of Patents